United States Patent

[11] 3,612,997

| | | |
|---|---|---|
| [72] | Inventor | John Paulkovich |
| | | 6001 Harland St., Lanham, Md. 20801 |
| [21] | Appl. No. | 12,048 |
| [22] | Filed | Feb. 18, 1970 |
| [45] | Patented | Oct. 12, 1971 |

[54] CAPACITOR APPARATUS INCLUDING A REFERENCE CAPACITOR FOR CONTROLLING THE CURRENT FLOW THROUGH A CAPACITANCE BEING MEASURED
16 Claims, 4 Drawing Figs.

| | | |
|---|---|---|
| [52] | U.S. Cl. | 324/60 C |
| [51] | Int. Cl. | G01r 27/26 |
| [50] | Field of Search | 324/60 R, 60 C, 60 CD |

[56] References Cited
UNITED STATES PATENTS

| | | | |
|---|---|---|---|
| 2,455,543 | 12/1948 | Williams | 324/60 CD |
| 3,452,272 | 6/1969 | Coclins et al. | 324/60 CD |
| 3,530,379 | 9/1970 | Demerliac | 324/60 R |

OTHER REFERENCES

Kukla; Rev. Sci. Instr.; June 1967; p. 804– 806. 324/78I.

*Primary Examiner*—Alfred E. Smith
*Attorney*—Griffin, Brannigan and Kindness

ABSTRACT: An apparatus for testing an item, such as a capacitor, to determine its capacitance value is described. A timing and reference capacitor is charged at a constant rate from a constant current source. The test capacitor charges at a related rate through a source follower transistor circuit which includes a current meter. The timing and reference, and the test capacitors are both discharged by a unijunction transistor when a predetermined potential level is reached. Thereafter, the charging cycle reoccurs.

PATENTED OCT 12 1971 3,612,997

INVENTOR
JOHN PAULKOVICH

BY Griffin, Branigan and Kindness
ATTORNEYS 3,612,997

CAPACITOR APPARATUS INCLUDING A REFERENCE CAPACITOR FOR CONTROLLING THE CURRENT FLOW THROUGH A CAPACITANCE BEING MEASURED

BACKGROUND OF THE INVENTION

This invention is directed to capacitance-testing instruments, and more particularly to a capacitor meter which accurately measures capacitance in a uncomplicated fashion.

As is well known in the electronic testing art, the conventional apparatus for measuring the capacitance of a capacitor more broadly a component, circuit or system having capacitance is with a capacitor bridge. This apparatus is rather cumbersome to work with because it requires the balancing of a bridge having known values against a capacitor having an unknown value until a null is reached. In other words, a series of switch manipulations designed to approach a null condition are required in order to obtain the desired measurement. While other systems that avoid this cumbersome method have been developed for capacitor testing, in general, they all require complex electronic circuits which make them expensive to manufacture and maintain.

Therefore, it is an object of this invention to provide a new and approved capacitance-measuring instrument.

It is also an object of this invention to provide a new and improved capacitor measuring instrument which is uncomplicated to use and inexpensive to manufacture and maintain.

It is a still further object of this invention to provide a capacitor-testing instrument which is directly readable and does not require manipulation of a plurality of switches in order to obtain a null condition.

SUMMARY OF THE INVENTION

In accordance with principles of this invention, an instrument suitable for measuring capacitance is provided. The instrument generally comprises a timing and reference capacitor connected to a constant current source. The constant current source also applies current through a source follower circuit to an item, such as a capacitor or the input or output terminals of circuit having capacitance. A display meter is connected in the source follower circuit. A relaxation oscillator is connected to both the timing and reference capacitor and the item to discharge the capacitor and the item when a predetermined voltage level is reached. In operation, the test capacitor is connected in series with the source follower circuit. The rate of current flow through the source follower as measured by the display meter is linearly proportional to the value of the capacitance being measured because only the linear portion of the capacitor charge cycle is measured.

In accordance with a further principle of this invention, the relaxation oscillator is a unijunction transistor, a four-layer diode, a diac, an ovonic threshold diode or any other device or circuit that will discharge a capacitor when the voltage on the capacitor reaches a predetermined level. In addition, the source follower is either a high-gain transistor or a field effect transistor.

In accordance with still further principles of this invention, scaling means are provided in the form of a resistor bank and a capacitor bank so that capacitors over a wide range of values can be measured by the invention.

It will be appreciated by those skilled in the art and others that the invention provides an uncomplicated and inexpensive apparatus for measuring capacitance. The invention overcomes the disadvantages of prior art systems requiring the balancing of a capacitor bridge in order to measure capacitance by providing means for measuring the value of a capacitor directly. Hence, it will be appreciated that this invention makes it easier for electronic technicians and engineers to test capacitors prior to their insertion into a circuit. The invention is also applicable to the testing of a plurality of capacitors of unknown value to determine their exact capacitance in order to separate them. Moreover, the invention can be used to test the input and output capacitance of an unenergized circuit or system as long as there is no DC path present.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
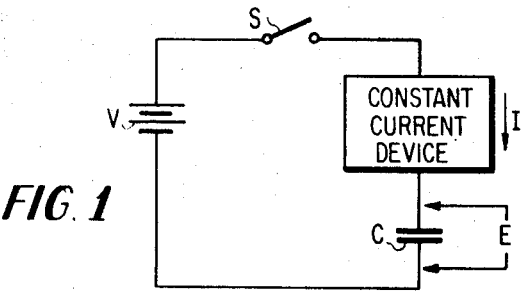
FIG. 1 is a partially block and partially schematic diagram illustrating the theory of operation of the invention.

FIG. 1 is a partially block, partially schematic diagram illustrating the theory of operation of the invention and comprises: a voltage source designated V; a switch designated S; a constant current device; and, a capacitor designated C.

It will be appreciated that, when C is charged at a constant rate, it will exhibit a voltage $E$ at time $T$ equal to:

$$E = IT/C \quad (1)$$

where
$E$ = the voltage across the capacitor;
$I$ = the constant current flow into the capacitor;
$T$ = the time I flows into the capacitor; and,
$C$ = the value of the capacitor.

The foregoing equation can be rearranged so that:

$$I = CE/T \quad (2)$$

And, if $E/T$ is held constant ($K$) this equation can be rewritten:

$$I = CK \quad (3)$$

In other words, the charging current is directly proportional to the magnitude of $C$ if the peak charge voltage and the time of charge are held constant. The invention provides an apparatus for maintaining this constant relation so that the proportion holds true.

Figure 2:
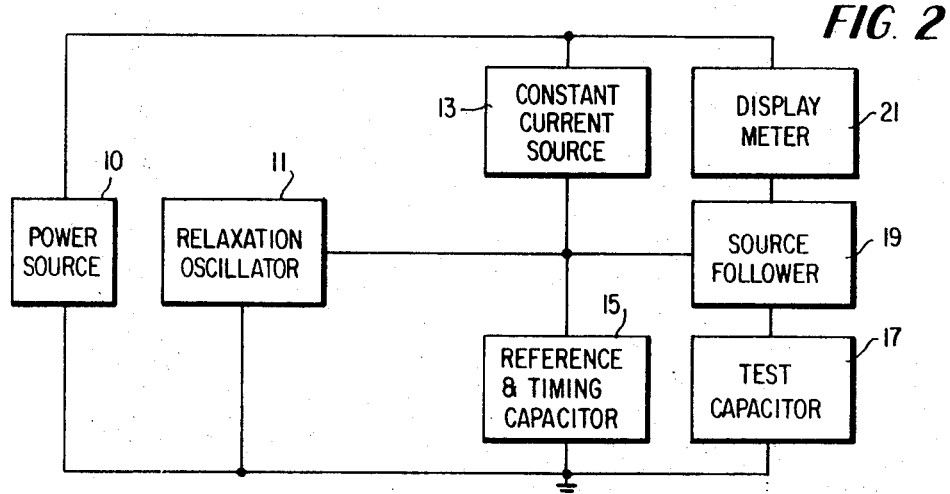
FIG. 2 is a block diagram illustrating the invention.

FIG. 2 is a block diagram illustrating a general apparatus for carrying out the invention and comprises: a power source 10; a relaxation oscillator 11; a constant current source 13; a reference and timing capacitor 15; a test capacitor ($C$) 17; a source follower 19; and a display meter 21. The constant current source 13 is connected to the relaxation oscillator 11; the source follower 19; and, the reference and timing capacitor 15. In addition, the constant current source is connected to the power source 10 and through the display meter 21 to the source follower 19. The source follower is connected through the test capacitor 17 to ground. The power source 10, the reference and timing capacitor 15 and the relaxation oscillator 11 are also connected to ground.

In operation, the constant current source 13 applies a charge current to the reference and timing capacitor 15. As the voltage across the reference and timing capacitor increases, the source follower applies the same voltage to the test capacitor in accordance with its source following function. Because the current applied to the reference and timing capacitor is constant, the rate of voltage level increase is constant. And, because the rate of voltage increase on both capacitors is constant, the current applied to the test capacitor is constant. Hence, the current applied to the unknown capacitor 17 through the display meter 21 is constant and, in accordance with the foregoing formula, directly proportional to the magnitude of the capacitance of the unknown capacitor. Thus, the magnitude of the current indicated on the face of the display meter 21 is an indication of the capacitance of the test capacitor and can be read directly.

In order to achieve linearity, when the magnitude of the voltage across the reference and timing capacitor (which is the same as the voltage across the test capacitor) reaches a predetermined level, the relaxation oscillator 11 fires and discharges both the reference and timing capacitor, and the test capacitor. The charging cycle is then repeated. Because the current source is a constant current source, the charge on the test capacitor and the current through the display meter 21 are constant except for the momentary interruption that occurs when the capacitors discharge.

Figure 3:
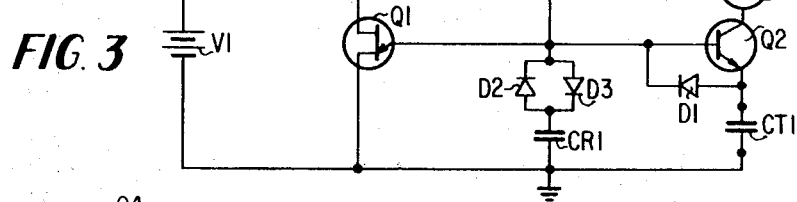
FIG. 3 is a schematic diagram illustrating one embodiment of the invention.

FIG. 3 is a schematic diagram of a single scale apparatus for carrying our the invention. The apparatus illustrated in FIG. 3 comprises: a voltage source designated V1; a unijunction transistor designated Q1; a constant current diode designated CD1; a timing and reference capacitor designated CR1; a test capacitor designated CT1; three diodes designated D1, D2 and D3; an NPN transistor designated Q2; and, a meter designated M1.

The positive terminal of V1 is connected to: one of the bases of Q1; the anode of CD1; and, one side of M1. The negative terminal of V1 which is also ground is connected to the other base of Q1; one side of CR1; and, one side of CT1. The emitter of Q1 is connected to the cathode of CD1, the cathode of D2 and the anode of D3. The anode of D2 and the cathode of D3 are connected to the other side of CR1. The emitter of Q1 is also connected to the base of Q2 and the cathode of D1. The collector of Q2 is connected to the other side of M1 and the emitter of Q1 is connected to the other side of CT1 and the anode of D1.

CR1 is the timing and reference capacitor and charges at linear rate determined by the value of CD1, the linear rate being expressed in FIG. 1 as I. CT1 charges at the same voltage rate as CR1 through the source follower transistor Q2. Because of the relationships previously described, the current through Q2 is directly proportional to the capacitance of CT1. Because this current is measured by M1, the reading of the face of M1 is in terms of capacitance. Preferably, Q2 is a high-gain transistor so as to minimize the loading on CR1. Alternatively, Q2 could be a field effect transistor. CR1 charges until its potential reaches the trigger point of Q1. At this point, Q1 discharges both CR1 and CT1. D1 provides the discharge path for CT1.

D3 is included in the circuit illustrated in FIG. 3 to compensate for the base-emitter voltage of Q2 in order that the reference and timing capacitor's and the unknown capacitor's voltage are equal during charge. D2 is included to compensate for D1 during discharge so that both capacitors are discharged to the same voltage level by Q1.

Figure 4:
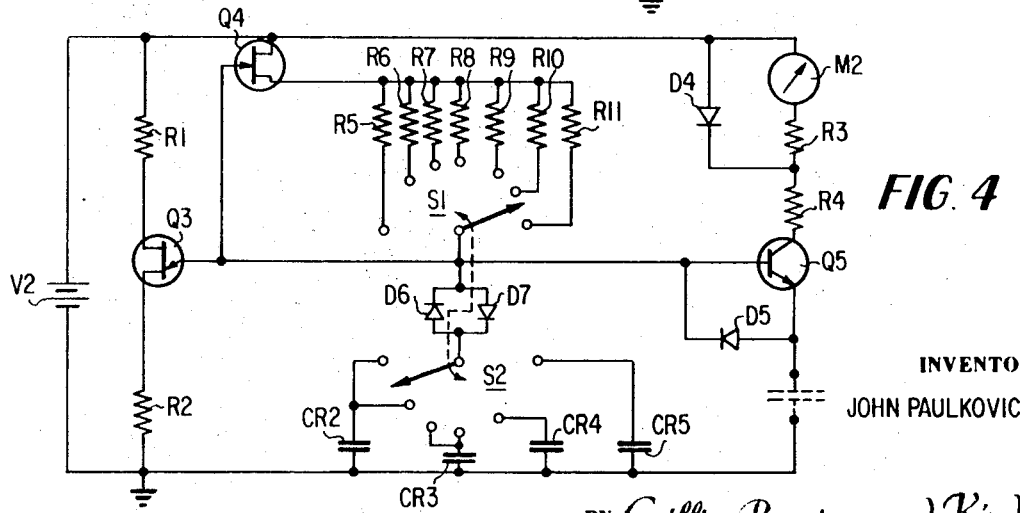
FIG. 4 is a schematic diagram illustrating a multiscale embodiment of the invention.

FIG. 4 is a schematic diagram illustrating a multiscale measuring instrument made in accordance with the invention. The circuit illustrated in FIG. 4 comprises: a voltage source designated V2; 11 resistors designated R1 through R11; four diodes designated D4 through D7; four timing and reference capacitors designated CR2 through CR5; a unijunction transistor designated Q3; a field effect transistor designated Q4; a transistor designated Q5; two seven-position switches designated S1 and S2; and, a meter designated M2.

The positive terminal of V2 is connected through R1 to one of the bases of Q3. The other base of Q3 is connected through R2 to the negative terminal or ground side of V2. The positive terminal of V2 is also connected to the drain terminal of Q4; the anode of D4; and, one side of M2. The source terminal of Q4 is connected to one side of R5 through R11. The other side of R5 through R11 are separately connected to the seven position terminals of S1. The common terminal of S1 is connected to the emitter of Q3 and the gate of Q4 as well as the cathode of D5 and base of Q5. The common terminal of S1 is further connected to the cathode of D6 and the anode of D7.

The anode of D6 and the cathode of D7 are connected together and to the common terminal of S2. Moving in a clockwise direction as viewed in FIG. 4, the first position terminal of S3 is connected to one side of CR5. The second and third position terminals of S3 are connected to one side of CR4. The fourth and fifth position terminals of S3 are connected to one side of CR3; and, the sixth and seventh position terminals of S3 are connected to one side of CR2. The other sides of CR2, CR3, CR4 and CR5 are connected together and to the negative terminal of V2.

The other side of M2 is connected through R3 in series with R4 to the collector of Q5. The cathode of D4 is connected to the junction between R3 and R4. The emitter of Q5 is connected to a first test terminal and to the anode of D5. The other test terminal is connected to the negative side of V2. The test terminals are adapted for connection to a capacitor (shown dashed in FIG. 4) whose value is to be determined. Preferably, the wipers of S2 and S3 are ganged together as illustrated by the dashed line.

FIG. 4 operates in essentially the same manner as the previously described embodiments of the invention. More specifically, Q4 is a field effect transistor which is connected so as to provide a constant current to CR2 through CR5. This constant current controls the voltage on CR2 through CR5, whichever is being used. And, it is this voltage which controls the current applied to the test capacitor and measured by M2. It should be noted that in order to decrease the component count, 11 resistors are used with four reference capacitors.

D6 and D7 are included in the circuit illustrated in FIG. 4 for the same reasons that D2 and D3 are included in the circuit illustrated in FIG. 3. That is, D7 is included to compensate for the base-emitter voltage of Q5 in order that the reference and timing capacitor's and the unknown capacitor's voltages are equal during charge. D6 is included to compensate for D5 during discharge so that both capacitors are discharged to the same voltage level by Q3. In this manner, the charging current applied to the test capacitor is maintained directly proportional to the magnitude of the test capacitor as indicated on the meter M2 so that once the system is calibrated, the value of the test capacitor can be read directly on the meter. Hence the invention provides capacitance measuring which is as simple as using a conventional ohmmeter, i.e., just insert the unknown capacitor, switch to the correct range and read the value of the capacitor. D4, R3 and R4 are included in the circuit to protect M2 from excess current in the event that the test terminals become shorted.

It will be appreciated from the foregoing description of the invention that a capacitance meter which eliminates the problems of prior art bridge capacitance-testing devices and prior art complex capacitance-measuring instruments is provided. For low values of capacitance, the discharge of the capacitors is so rapid that the human eye cannot follow it on the display meter. For larger values of capacitance, the discharge can be viewed, however, the discharge occurs at such a low rate that the benefits of the invention are not lost.

While preferred embodiments of the invention have been illustrated and described, it will be appreciated that the invention can be practiced otherwise than as specifically described herein. For example, Q2 and Q5 of FIGS. 3 and 4, respectively are illustrated as high-gain transistors, however, these devices could be replaced by field effect transistors. In addition, the unijunction transistor forming the relaxation oscillator could be replaced by a four-layer diode, a diac, an ovonic threshold diode or any other device or circuit that will discharge the timing and reference, and test capacitors when the voltage on the capacitors reaches the desired level. Moreover, the invention can be used to measure circuit or system input and output capacitance (provided there is no DC path) as well as the capacitance of individual components.

The embodiments of the invention in which an exclusive property or privilege is claimed are defined as follows:

1. Apparatus for measuring the capacitance of an item comprising:

constant current means for generating a constant current flow;

storage means connected to said constant current means for storing the current generated by said constant current means;

source follower means connected to said storage means and adapted for connection to said item whose capacitance is to be measured for controlling the application of current to said item in accordance with the voltage level of the current stored by said storage means, said source follower means including an indicator means for indicating the amount of current flow passing through said source follower means; and, discharge means connected to said storage means and to said source follower means for discharging the current stored by said storage means and the current stored by said item whose capacitance is to be measured.

2. Apparatus for measuring the capacitance of an item as claimed in claim 1 wherein said storage means includes at least one timing and reference capacitor.

3. Apparatus for measuring the capacitance of an item as claimed in claim 2 wherein said discharge means is a relaxation oscillator.

4. Apparatus for measuring the capacitance of an item as claimed in claim 3 wherein said indicator means is a meter.

5. Apparatus for measuring the capacitance of an item as claimed in claim 4 wherein said constant current means include a constant current diode and a voltage source connected in series with said at least one reference and timing capacitor.

6. Apparatus for measuring the capacitance of an item as claimed in claim 5 wherein said relaxation oscillator is a unijunction transistor having its bases connected across the terminals of said voltage source and its emitter connected to the junction between said constant current diode and said at least one reference and timing capacitor.

7. Apparatus for measuring the capacitance of an item as claimed in claim 6 wherein said source follower means is a transistor having its emitter adapted for connection to said item whose capacitance is to be measured, its collector connected through said meter to said voltage source and its base connected to the emitter of said unijunction transistor.

8. Apparatus for measuring the capacitance of an item as claimed in claim 7 including a diode connected between the base of said transistor and the emitter of said transistor.

9. Apparatus for measuring the capacitance of an item as claimed in claim 2 wherein said constant current means includes a constant current diode and a voltage source connected in series with said at least one reference and timing capacitor.

10. Apparatus for measuring the capacitance of an item as claimed in claim 9 wherein said discharge means is a unijunction transistor having its bases connected across the terminals of said voltage source and its emitter connected to the junction between said constant current diode and said at least one reference and timing capacitor.

11. Apparatus for measuring the capacitance of an item as claimed in claim 10 wherein said source follower means is a high-gain transistor and said indicator is a meter, the emitter of said high-gain transistor adapted for connection to said item whose capacitance is to be measured, the collector of said high-gain transistor connected through said meter to said voltage source and the base of said high-gain transistor connected to the emitter of said unijunction transistor.

12. Apparatus for measuring the capacitance of an item as claimed in claim 1 wherein said constant current means includes a field effect transistor and a voltage source connected so that the source and drain terminals of said field effect transistor are in series with said voltage source and said storage means.

13. Apparatus for measuring the capacitance of an item as claimed in claim 12 wherein said storage means includes a plurality of capacitors and a first multiterminal switch, said plurality of capacitors being connected at one end to predetermined terminals of said first multiterminal switch and at the other end to one side of said voltage source; said storage means further including a plurality of resistors and a second multiterminal switch, said plurality of resistors being connected at one end to predetermined terminals of said second multiterminal switch and at the other end to the source terminal of said field effect transistor; the wiper terminals of said first and second multiterminal switches being connected together.

14. Apparatus for measuring the capacitance of an item as claimed in claim 13 wherein said discharge means comprises a unijunction transistor having its bases connected across the terminals of said voltage source and having its emitter connected to the gate of said field effect transistor and to the wiper terminal of said second multiterminal switch.

15. Apparatus for measuring the capacitance of an item as claimed in claim 14 wherein said source follower means comprises a transistor and said indicator means is a current meter, said transistor having its base connected to the emitter of said unijunction transistor, its emitter connected to a first test terminal and its collector through said current meter to one side of said voltage source, the other side of said voltage source being connected to a second test terminal.

16. Apparatus for measuring the capacitance of an item as claimed in claim 15 including four diodes, the first and second diodes being connected parallel opposing between the wiper terminals of said first and second switches, the third diode being connected in parallel with said meter, and the fourth diode being connected across the emitter-base terminals of said transistor.